United States Patent [19]

Marshall

[11] 4,010,664
[45] Mar. 8, 1977

[54] BIAS PLY CUTTER FEED APPARATUS
[75] Inventor: Richard P. Marshall, Akron, Ohio
[73] Assignee: The Goodyear Tire & Rubber Company, Akron, Ohio
[22] Filed: Mar. 19, 1976
[21] Appl. No.: 668,551
[52] U.S. Cl. ................................ 83/277; 83/471.3; 83/486.1; 83/614
[51] Int. Cl.² ...................... B26D 5/20; B26D 7/06
[58] Field of Search ......... 83/277, 282, 207, 471.2, 83/471.3, 477.1, 477.2, 581, 486.1, 614

[56] References Cited
UNITED STATES PATENTS

| | | | |
|---|---|---|---|
| 2,873,802 | 2/1959 | Frohlich et al. | 83/614 |
| 3,207,019 | 9/1965 | Vanzo et al. | 83/277 |
| 3,649,416 | 3/1972 | Chapman et al. | 83/277 |
| 3,774,486 | 11/1973 | Johnsson | 83/277 |
| 3,859,152 | 1/1975 | Brey et al. | 83/614 |

Primary Examiner—Donald R. Schran
Attorney, Agent, or Firm—F. W. Brunner; R. S. Washburn

[57] ABSTRACT

Ply stock is delivered to a bias-cutter by a feed mechanism which moves the stock to be bias cut in measured increments of length. The present apparatus provides a smooth continuous surface of a feed pan supporting the full width of the ply stock to a forward edge which is adjustable angularly to the angle of the desired bias cut. The feed pan moves toward the shear line of the bias-cutter with the ply stock held on the surface; then with holding clamps released is drawn away from the shear line while the ply stock is held to the shear line. The feed pan is less subject to distortion or deflection and is relatively insensitive to changes in humidity. Accuracy of both bias angle cut and length of cut are improved.

6 Claims, 4 Drawing Figures

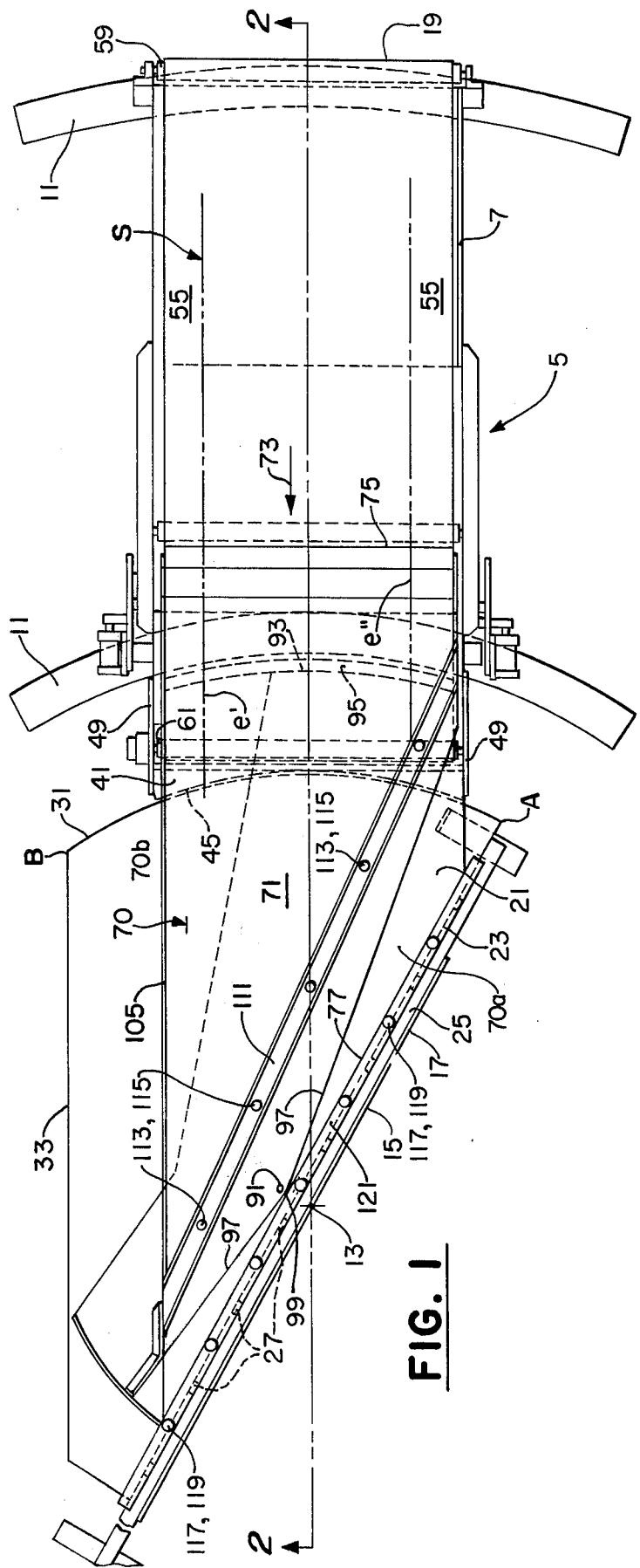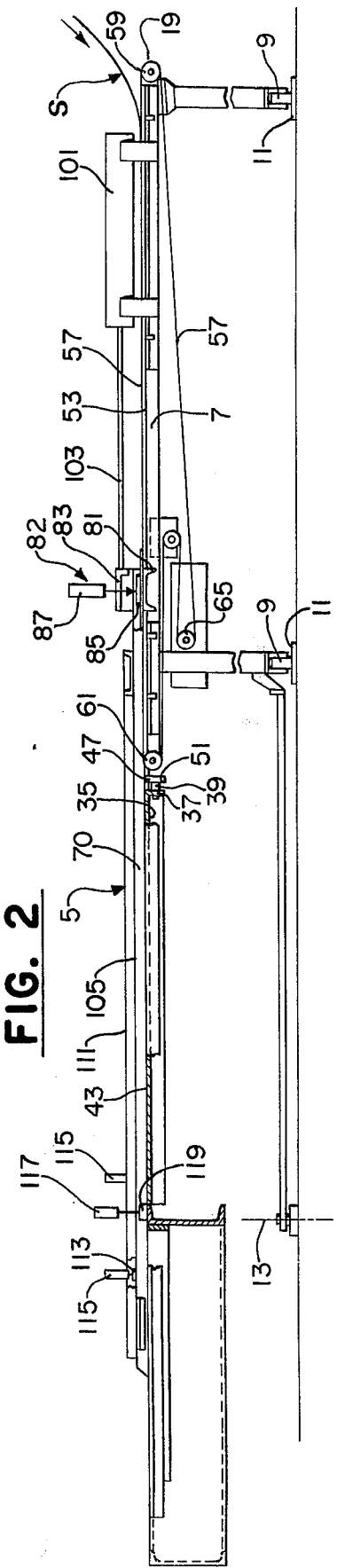

BIAS PLY CUTTER FEED APPARATUS

The foregoing abstract is not to be taken as limiting the invention of this application, and in order to understand the full nature and extent of the technical disclosure of this application, reference must be made to the accompanying drawing and the following detailed description.

This invention relates to apparatus for bias-cutting tire ply stock and particularly to a stock feed mechanism for moving such stock from a supply thereof to be bias cut.

Briefly, the invention provides an improvement in apparatus including a bias-ply cutter for bias-cutting tire ply stock along a shear line at a preselected angle with respect to the lengthwise direction of the ply stock, and a stock feed mechanism for advancing a predetermined length of tire ply stock beyond the shear line from a supply of the stock, the feed mechanism being mounted movably to provide for changing the selected bias angle, the improvement in such feed mechanism comprising the combination and arrangement of a first plate having a straight line edge fixed adjacent and parallel to the shear line and an arcuate edge, a second plate coplanar with the first plate having a conjugate arcuate edge closely opposed to the arcuate edge of the first plate and mounted for pivotal movement about an axis normal to the shear line, a feed pan having a smooth continuous top surface extending perpendicularly of said lengthwise direction beyond the respective longitudinal edges of said stock and extending parallel to said direction between a rear edge line transverse to said direction and a forward edge line oblique to said direction, said pan being slidable over the first and second plates parallel to said direction, means for clamping said stock to said pan, and means for moving said pan a preset distance forwardly to said shear line.

To acquaint persons skilled in the related arts with the principles and preferred mode of practice of the invention, a particular embodiment thereof is described below, referring to the accompanying drawings in which:

FIG. 1 is a synoptic plan view of an apparatus in accordance with the invention;

FIG. 2 is an elevation view taken as indicated by the line 2—2 of FIG. 1;

Figure 4:
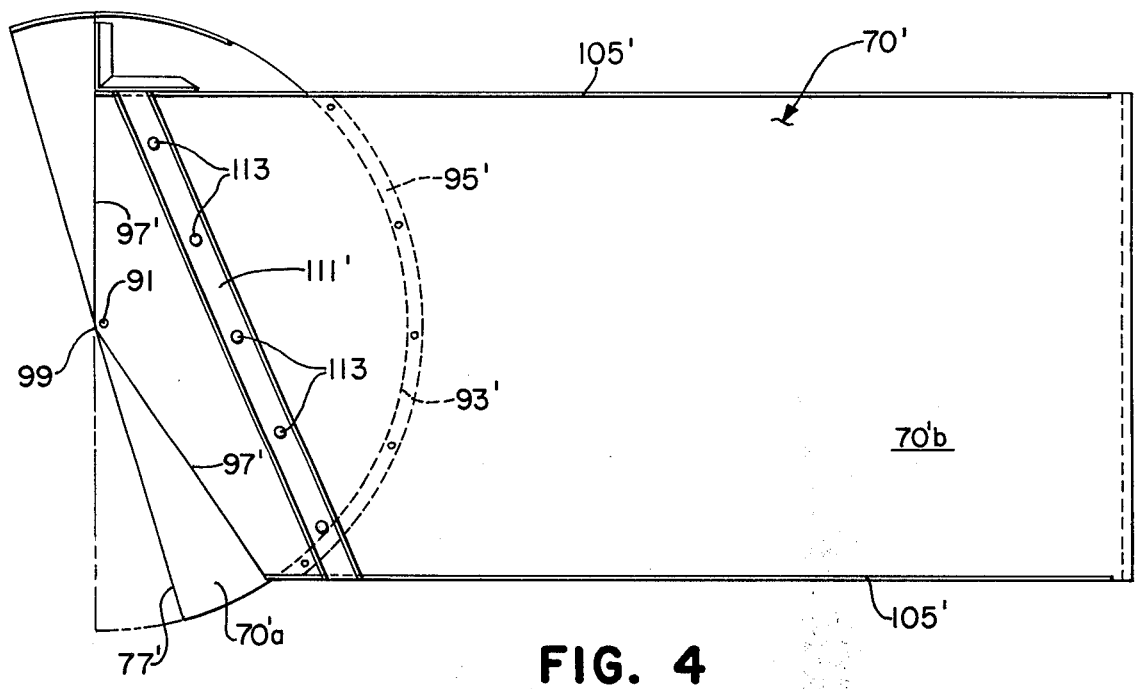
FIGS. 3 and 4 are alternative forms of a portion of the apparatus of FIG. 1.

The feed mechanism 5, illustrated in FIGS. 1 and 2, includes a carriage 7 having wheels 9 rollable on arcuate tracks 11, the arcs of which have a common center in the pivot axis 13 which extends perpendicular to the shear line 15 of the fixed knife 17 along which the ply stock is severed. The bias-cutter apparatus of which the fixed knife is a part is entirely conventional and, therefore, is not shown or further described. A particularly satisfactory apparatus with which the feed mechanism 5 is associated is furnished by Spadone Machine Company of Norwalk, Connecticut.

A stock feed letoff assembly, not shown, can advantageously be mounted at the infeed end 19 of the carriage 7 to supply the ply stock to the feed mechanism 5 as required.

As thus far described, the arrangement is conventional.

According to the invention, the improvement comprises a first plate 21 which has a straight edge 23 which is fixed parallel the shear line 15, coplanar with the shearing edge, to the fixed knife beam 25 by a plurality of attachment clips 27 or other suitable means. The edge 31 of the plate 21 remote from the shear line is formed as an arc of a circle having its center at the stock feed pivot axis 13 and extends between the points A and B. The remaining edge 33 or edges can be of any convenient shape and location. The first plate 21 is supported by suitable stiffeners 35 including a bar 37 which conforms to and supports from beneath the arcuate edge 31. A plurality of small rollers 39, of the type commonly called cam followers, are attached to the bar to extend radially at intervals along the arc thereof. The first plate 21 cooperates with a second plate 41 to form a coplanar surface 43.

The second plate 41 having a conjugate arcuate edge 45 closely opposed to the arcuate edge 31 of the first plate is fixed on the carriage 7 to provide the continuous surface 43 essentially coplanar on the first plate and on the carriage. A curved stiffener beam 47 affixed to the side rails 49 of the carriage and conforming to the edge 45 provides a track 51 in which the small rollers 39 roll thereby maintaining the coplanar relation between the first and second plates.

The top surface 53 of the carriage 7 supports the upper reach 55 of an endless wide flat belt 57 between a belt roll 59 at the entry end 19 and a second belt roll 61 immediately adjacent the rearward edge of the second plate 41. The return reach of the belt 57 is provided with a conventional take-up 65 for maintaining a suitable tension in the belt. The arrangement is such that the coplanar surface 43 of the first and second plate and the surface of the wide flat belt upper reach 55 are substantially continuous and coplanar whatever the angular disposition of the carriage with respect to the shear line.

Superposed slidably on the coplanar surface 43 is a feed pan 70 having a smooth continuous top surface 71 extending perpendicularly of the direction 73 of stock movement, beyond the respective longitudinal edges e' and e'' of the stock S and extending as well parallel to the direction of movement of the stock between a rear edge line 75 normal to the direction of the stock movement and a forward edge line 77 extending obliquely with respect to the direction. The feed pan 70 is secured to the upper reach 55 of the belt and to a channel 81 extending transversely of the carriage 7 between its side rails 49. The channel is supported for movement longitudinally of the carriage. A ply stock clamp assembly 82 for holding stock relative to the feed pan has a bridge beam 83 secured to the channel and extends parallel to the channel across the width of the belt 57 and supports a clamp pad 85 actuated by a plurality of air cylinders 87 supported on the bridge beam to move the clamp pad 85 alternately between a position spaced from the belt and ply stock thereon and a clamping position wherein the ply stock is clamped to the feed pan to prevent relative movement between the stock and the pan.

Figure 3:
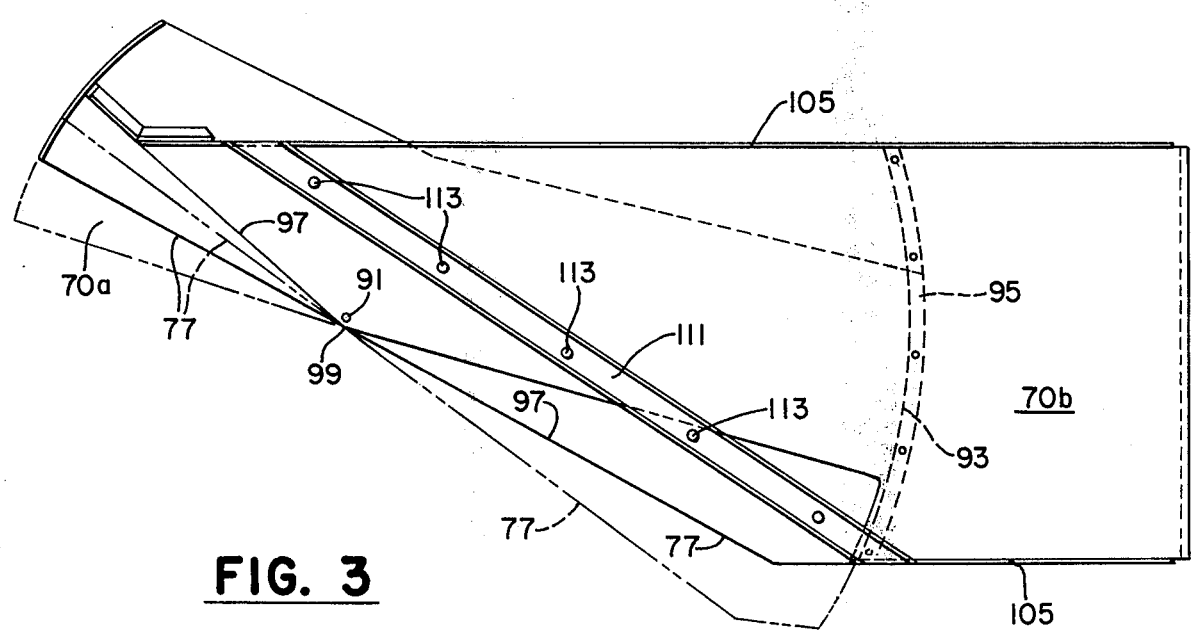

In accordance with the invention, and referring also to FIGS. 3 and 4, to provide continuous support to the ply stock across the full width of the ply stock being advanced toward the shear line 15, the aforementioned oblique edge 77 of the feed pan is formed in a forward portion 70a of the pan portion which is pivotally secured to the rearward portion 70b by a pivot pin 91 fixed in the rearward portion 70b of the feed pan such that the obliquity of the forward edge 77 can be adjusted to parallel the shear line. The forward portion 70a of the pan is also provided with an arcuate edge 93 which is slidably supported by an arcuate track 95 affixed to the rearward portion 70b of the feed pan. The rearward portion 70b of the feed pan overlies the forward portion 70a and extends to an edge 97 which defines an obtuse angle the vertex 99 of which is adjacent to the pivot pin, the two legs of the angle being selected according to the limits of angular adjustment desired in the position of the carriage with respect to the shear line.

The feed pan 70, including both rearward and forward portions, are of sheet metal, preferably stainless steel of not more than about 3½ to 4 millimeters. In the present embodiment No. 10 U.S. gauge is used.

In the feed pan of FIG. 3, the forward obtuse angle is about 165°.

In the feed pan of FIG. 4, the obtuse angle subtended by the forward edge 97' of the rearward portion of the feed pan subtends about 144°.

In FIG. 3, the feed pan 70 of FIGS. 1 and 2 is shown enlarged to facilitate comparison with the feed pan 70' of FIG. 4. As will be apparent from inspection of FIGS. 3 and 4, the arrangement of the pan 70 is particularly adapted for use in feeding ply stock at large bias angles, for example, in the range of 15° to 35° to the running length and direction of feed movement of the stock. The feed pan 70', FIG. 4 is particularly adapted for use at bias angles of from 35° to 90°. Interchange of the pans 70 and 70' is easily and quickly accomplished. The described elements of the pan 70' are identified by numbers identical to elements of the pan 70, a prime (') being added by way of distinction.

To provide the measured feed advance of the ply stock commensurate with the desired width of bias-ply stock to be prepared in the apparatus, a cylinder 101 supported on the carriage 7 has its piston rod 103 connected to the bridge beam 83 of the stock clamp assembly 82 so that operation of the cylinder will move the stock clamp assembly, the stock, the feed pan, and the belt as a unit in the direction 73.

The edges 105 of the feed pan 70 parallel to the direction of movement are turned upwardly with respect to the surface 71 of the pan to provide stiffening support for the pan surface. A lightweight beam 111 extends across the pan and is secured to the upwardly turned edges 105. This beam extends at an angle with respect to the direction of movement of the stock which angle is intermediate the angular range of adjustment of the edge 77 of the forward portion 70a of the pan. A plurality of clamps 113 actuated by small commercial air cylinders 115 serve as additional means to hold the stock against the surface 71 of the pan during its feed-forward movement.

To secure the ply stock in a fixed position relative to the shear line 15, a plurality of small commercial air cylinders 117 each having a presser foot 119 are mounted on a beam 121 extending parallel to the shear line 15 and close to the fixed knife 25. The presser feet 119 hold the stock while the feed pan 70 and clamp assembly 82 are moved back for a next feed forward stroke.

In operation, after stock S has been positioned so that its leading end extends to and beyond the shear line 15 from the letoff and a first cut at the desired bias angle has been made, the cylinders 117 are actuated to hold the stock adjacent to the shear line. The stock clamp assembly 82 and feed pan 70 are then moved toward the letoff, sliding along the stationary belt 57 and beneath the length of ply stock overlying the pan. The stock clamps 113 and 85 are, of course, moved free of the stock before this rearward movement. The feed pan is moved toward the letoff a distance corresponding to the length of stock which will be cut off. Then the clamp pad 85 and the stock clamps 113 carried by the beam 111 are actuated to hold the stock securely against the surface 71 of the pan and the cylinder 101 then again actuated to move the stock clamp assembly, the pan, and belt forward by the preset distance corresponding to the length to be cut off. This movement advances the stock to be cut off forward beyond the shear line 15. The bias-cutter knife then shears the stock along the shear line. When the predetermined length is cut from the ply stock, the holding clamps 119 being actuated to hold the stock relative to the shear line 15, and the stock feed clamps 85 and 113 being released to free the stock from the feed pan, the feed pan and clamp assembly are moved again toward the letoff by the feed cylinder 101 a distance corresponding to the length to be cut off and the cycle is repeated.

The apparatus according to the invention provides a number of advantages. Not only is the adjustment of the desired bias angle very simple and direct, the cost of maintaining the system in an accurately functioning condition is simple and inexpensive. Moreover, the feed pan supports the stock being fed continuously both transversely of and longitudinally without gaps and is insensitive to changes in temperature, humidity, as well as to any forces encountered in the reciprocal movement in the feed mechanism.

While certain representative embodiments and details have been shown for the purpose of illustrating the invention, it will be apparent to those skilled in the art that various changes and modifications may be made therein without departing from the spirit or scope of the invention.

What is claimed is:

1. In apparatus including a bias-ply cutter for bias-cutting tire ply stock along a shear line at a preselected bias angle with respect to the lengthwise direction of the stock, and stock feed mechanism for advancing a predetermined length of stock beyond the shear line from a supply of such stock, said feed mechanism being mounted movably to provide for changing the selected bias angle;

the improvement in said feed mechanism comprising the combination and arrangement of a first plate having a straight line edge fixed adjacent and parallel to the shear line and an arcuate edge;

a second plate coplanar with the first plate having a conjugate edge closely opposed to the arcuate edge of the planar plate and mounted for pivotal movement about an axis normal to the shear line;

a feed pan having a smooth continuous flat top surface extending perpendicularly of said direction beyond the respective longitudinal edges of said stock and extending parallel to said direction to a rear edge normal to said direction and to a forward edge line oblique to said direction, said pan being slidable over the first and second plates parallel to said direction;

means for clamping said stock to said pan, and means for moving said pan a preset distance forwardly toward said shear line.

2. An apparatus as claimed in claim 1, wherein said first plate and said second plate have coplanar upper surfaces for continuous support of said feed pan at any selected bias angle adjustment of said feed mechanism.

3. Apparatus as claimed in claim 2, comprising an arcuate track fixed adjacent said arcuate edge on one of said plates and a plurality of rolls rollable on said track fixed on the other of said plates.

4. Apparatus as claimed in claim 1, said feed pan comprising a forward portion defining said forward edge line, a rearward portion including said rear edge line, a pivot fixed in the rearward portion, the forward portion being attached to the rearward portion to turn about said pivot to reset the forward edge line parallel to the shear line when said feed mechanism is moved to provide said adjustment.

5. Apparatus as claimed in claim 4, wherein said rearward portion overlies said forward portion to an edge defining an obtuse angle the vertex of which is adjacent said pivot.

6. Apparatus as claimed in claim 5, wherein one side of said obtuse angle is disposed at from 15° to 35° with respect to said direction.

* * * * *